Patented Apr. 9, 1940

2,196,803

UNITED STATES PATENT OFFICE 2,196,803

MANUFACTURE OF ARTIFICIAL MASSES FROM POLYVINYL CHLORIDE

Georg Wick, Bitterfeld, Germany, assignor to I. G. Farbenindustrie Aktiengesellschaft, Frankfort-on-the-Main, Germany No Drawing. Application November 6, 1937, Serial No. 173,121. In Germany November 20, 1936

3 Claims. (Cl. 18—55)

The present invention relates to a process for shaping polyvinyl chloride.

It is an improvement of my copending application Serial No. 111,622, filed November 19, 1936. That application describes a process for shaping crude polyvinylchloride in the absence of plastifiers by pressing it at a temperature above about 140° C.

According to the present invention the process above described can be modified by first plasticizing the polyvinyl chloride, which may be pulverulent or in pieces, and rendering it free from air by thoroughly working it, for example by kneading, at a temperature above 140° C., for example at about 150 to about 160° C., and then moulding the material at a lower temperature, for example at about 90 to about 110° C., by pressing or spraying. It is surprising that the moulded objects thus prepared have the same properties as those which have been pressed or sprayed at a higher temperature, so that in this manner also it is possible to obtain articles which are free from strains and have very good mechanical properties. The procedure has the advantage that the articles do not lose their original form during cooling after removal from the mould.

For example 5 kilos of polyvinyl chloride may be plasticized in a heated masticator, the heating being so adjusted that the mass attains a temperature of about 160° C. The hot plastic mass having this temperature may then be moulded, for instance, in a spray-casting machine of which the mould is heated at about 105° C. At this temperature the moulded articles are mechanically stable and can be removed from the mould immediately after the moulding operation. The articles are free from strains and have good mechanical properties, for example a high resistance to breakage and to shock.

The polyvinyl chloride mentioned in the foregoing example has a polymerization degree $K=60$ (this K value being calculated according to the equations given in "Cellulose-Chemie," vol. XIII, 1923, page 60, right column: $K=k \cdot 10^3$).

It is obvious that the invention is not limited to the foregoing example or to the specific details given therein. Thus, for instance, the temperature to which the polyvinyl chloride is heated in the first stage, may be varied and a somewhat lower temperature may be used with polyvinyl chlorides of a lower degree of polymerization. Generally, however, a minimum temperature of about 140° C. is necessary. On the other hand, higher temperatures up to the decomposition point, that is to about 300° C., are permissible if care is taken that such higher temperatures exert influence only for a minimum of time. The best kind of heating and the most suitable temperature to be employed with a particular polyvinyl chloride are determined, if necessary, in each case by a simple experiment.

Finally, the temperature at which moulding of the material previously heated to a distinct higher temperature, is performed, likewise may be varied, and as a rule, all temperatures higher than the softening point of polyvinyl chloride are admissible. Generally, the moulding operation may be carried out at a temperature of about 90° C. to about 140° C.

What I claim is:

1. In the process for manufacturing formed articles of polyvinyl chloride free from softening and plastifying agents the steps which comprise heating polyvinyl chloride to a temperature higher than about 140° C. while thoroughly working it and moulding the material under pressure at a lower temperature of about 90° C. to below 140° C.

2. In the process for manufacturing formed articles of polyvinyl chloride free from softening and plastifying agents the steps which comprise heating polyvinyl chloride to a temperature of about 150 to about 160° C. while thoroughly working it and moulding the material under pressure at about 90 to about 110° C.

3. In the process for manufacturing formed articles of polyvinyl chloride free from softening and plastifying agents the steps which comprise heating polyvinyl chloride of polymerization degree $K=60$ to a temperature of about 160° C. while thoroughly working it and moulding the material under pressure at about 105° C.

GEORG WICK.